(12) United States Patent
Zhang et al.

(10) Patent No.: US 11,252,725 B2
(45) Date of Patent: Feb. 15, 2022

(54) DATA COMMUNICATION METHOD AND APPARATUS AND STORAGE MEDIUM

(71) Applicant: GUANGDONG OPPO MOBILE TELECOMMUNICATIONS CORP., LTD., Guangdong (CN)

(72) Inventors: Zhi Zhang, Dongguan (CN); Jia Shen, Dongguan (CN); Hua Xu, Ottawa (CA); Zhihua Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 124 days.

(21) Appl. No.: 16/478,744

(22) PCT Filed: Jan. 9, 2018

(86) PCT No.: PCT/CN2018/071881
§ 371 (c)(1),
(2) Date: Jul. 17, 2019

(87) PCT Pub. No.: WO2018/133700
PCT Pub. Date: Jul. 26, 2018

(65) Prior Publication Data
US 2019/0364567 A1    Nov. 28, 2019

Related U.S. Application Data

(60) Provisional application No. 62/448,847, filed on Jan. 20, 2017.

(51) Int. Cl.
*H04W 72/04* (2009.01)
*H04W 8/24* (2009.01)

(52) U.S. Cl.
CPC ......... *H04W 72/0453* (2013.01); *H04W 8/24* (2013.01); *H04W 72/042* (2013.01)

(58) Field of Classification Search
None
See application file for complete search history.

(56) References Cited

U.S. PATENT DOCUMENTS

| 2012/0083309 A1 | 4/2012 | Kwon |
| 2014/0162642 A1 | 6/2014 | Kwon et al. |

(Continued)

FOREIGN PATENT DOCUMENTS

| GB | 2491157 A | * 11/2012 | ........... H04L 5/0023 |
| RU | 2600978 C1 | 10/2016 | |

(Continued)

OTHER PUBLICATIONS

First Office Action of the Chilean application No. 201902033, dated Apr. 20, 2020.

(Continued)

*Primary Examiner* — Saba Tsegaye
(74) *Attorney, Agent, or Firm* — Ladas & Parry, LLP (57) ABSTRACT

Disclosed is a data communication method. In the method, a user equipment (UE) sends a report including the UE's capability of using multiple radio frequency (RF) chains for data communication, to a base station, receives an instruction of how to use the multiple RF chains in a component carrier for the data communication, from the base station, configures a number of the RF chains to operate in the component carrier according to the instruction, and performs the data communication with the base station through using the number of the configured RF chains in the component carrier. Also disclosed is a data communication apparatus and computer readable storage medium.

22 Claims, 3 Drawing Sheets receiving from a UE a report including the UE's capability of using multiple RF chains for data communication — 301 instructing the UE on how to use the multiple RF chains in a component carrier based on the report — 302

(56) References Cited

U.S. PATENT DOCUMENTS

| | | | | |
|---|---|---|---|---|
| 2015/0327103 | A1* | 11/2015 | Tang | H04W 24/10 |
| | | | | 370/252 |
| 2016/0050534 | A1* | 2/2016 | Lim | G01S 5/0236 |
| | | | | 370/252 |
| 2016/0302203 | A1* | 10/2016 | Liu | H04L 5/001 |
| 2017/0013623 | A1 | 1/2017 | Chin et al. | |
| 2018/0034598 | A1* | 2/2018 | Yiu | H04W 52/0216 |
| 2018/0092095 | A1* | 3/2018 | Zeng | H04L 5/0007 |
| 2018/0132200 | A1* | 5/2018 | Gheorghiu | H04W 88/027 |
| 2018/0152944 | A1* | 5/2018 | Kumar | H04W 24/10 |

FOREIGN PATENT DOCUMENTS

| | | |
|---|---|---|
| WO | 2013169061 A1 | 11/2013 |
| WO | 2016164782 A1 | 10/2016 |

OTHER PUBLICATIONS

First Office Action of the Canadian application No. 3050821, dated Oct. 30, 2020.

Huawei: "Discussion on UE RF capability parameters", 3GPP Draft; R4-103110, 3rd Generation Partnership Project (3GPP), Mobile Competence Centre; 650, Route Des Lucioles; F-06921 Sophia-Antipolis Cedex; France, vol. RAN WG4, no. Madrid, Spain; Aug. 23, 2010, Aug. 18, 2010 (Aug. 18, 2010), XP050454307, [retrieved on Aug. 18, 2010] Sections 1, 2.

Oppo: "Impact of BWP on CA", 3GPP Draft; R2-1710125—Impact of Bandwidth Part On CA, 3rd Generation Partnership Project (3GPP), Mobile Competence Centre; 650, Route Des Lucioles; F-06921 Sophia-Antipolis Cedex; France vol. RAN WG2, no. Prague, Czech Republic Oct. 9, 2017-Oct. 13, 2017; Sep. 28, 2017 (Sep. 28, 2017), XP051354207; [retrieved on Sep. 28, 2017] the whole document.

Oppo: "Discussion on BWP configuration and mobility with BWP operation", 3GPP Draft; R2-1712250 Discussion On Configuration and Mobility About BWP Operation, 3rd Generation Partnership Project (3GPP), Mobile Competence Centre; 650, Route Des Lucioles; F-06921 Sophia-Anti, vol. RAN WG2, no. Reno, USA; Nov. 27, 2017-Dec. 1, 2017 Nov. 17, 2017 (Nov. 17, 2017), XP051371376 [retrieved on Nov. 17, 2017] the whole document.

Supplementary European Search Report in the European application No. 18741223.4, dated Aug. 20, 2019.

International Search Report in international application No. PCT/CN2018/071881, dated Mar. 28, 2018.

Written Opinion of the International Search Authority in international application No. PCT/CN2018/071881, dated Mar. 28, 2018.

Intel Corporation Support of per component carrier based configuration gaps, R2-166266 3GPP TSG-RAN WG2 Meeting #95bis Oct. 14, 2016(Oct. 14, 2016) sections1-3.

Samsung Consideration on UE capability in CA scenario, R4-101840 3GPP TSG RAN WG4 Meeting #55 May 15, 2010(May 15, 2010) sections1-3.

LG Electronics D2D-WAN capability for simultaneous Transmission and reception, R4-146952 3GPP TSG RAN WG4 Meeting #73 Nov. 21, 2014(Nov. 21, 2014) sections1-3.

Second Office Action of the Chilean application No. 201902033, dated Aug. 17, 2020.

Qualcomm Incorporated; "Views on wideband NR operation", 3GPP TSG RAN WG1 RAN1 NR AdHoc, R1-1700840, Jan. 16-20, 2017.

First Office Action of the European application No. 18741223.4, dated Jan. 26, 2021.

First Office Action of the Indian application No. 201917032484, dated Mar. 10, 2021.

First Office Action of the Russian application No. 2019125608, dated Mar. 2, 2021.

Second Office Action of the Canadian application No. 3050821, dated Apr. 26, 2021.

First Office Action of the Taiwanese application No. 107101958, dated May 31, 2021.

First Office Action of the Israeli application No. 268134, dated Aug. 12, 2021.

Third Office Action of the Chilean application No. 201902033, dated Aug. 31, 2021.

Office Action of the Australian application No. 2018208908, dated Oct. 15, 2021.

First Office Action of the Indonesian application No. P00201907312, dated Nov. 28, 2021.

Second Office Action of the Australian application No. 2018208908, dated Dec. 15, 2021.

Decision of Re-Examination of the Taiwanese application No. 107101958, dated Oct. 28, 2021.

* cited by examiner

DATA COMMUNICATION METHOD AND APPARATUS AND STORAGE MEDIUM

CROSS-REFERENCE TO RELATED APPLICATIONS

The present application is the U.S. national phase of PCT Application No. PCT/CN2018/071881 filed on Jan. 9, 2018, which claims benefit of U.S. Provisional Application No. 62/448,847, filed on Jan. 20, 2017, the contents of which are hereby incorporated by reference in their entireties.

TECHNICAL FIELD

The present disclosure relates to the technical field of communications, and particularly a data communication method and apparatus and storage medium.

BACKGROUND ART

In a Fourth-Generation (4G) Long Term Evolution (LTE) communication system, one component carrier has a maximum bandwidth of 20 MHz, and a user equipment (UE) can use just one Radio Frequency (RF) chain to cover the whole bandwidth.

When it comes to a Fifth-Generation (5G) New Radio (NR) communication system, in order to implement a higher peak data rate and cell capability, a component carrier may have a much larger bandwidth, for example, 80 MHz, or even larger than 100 MHz. However, existing power amplifiers included in RF chains are generally designed to have an operating bandwidth which is much less than 100 MHz (e.g., 40 MHz), while a power amplifier designed with a larger operating bandwidth (e.g., 60 MHz or 80 MHz) will cause a significant increase of the cost thereof. Moreover, the large bandwidth also brings a great challenge in terms of power consumption, cost, processing capability to other devices in the RF chain (e.g., the A/D and D/A converters) and the baseband processor. Therefore, it is difficult for a UE to use just one RF chain to cover such a large bandwidth. Accordingly, how to use the RF chain(s) of the UE, particularly when the UE has multiple available RF chains, to perform data communication in the component carrier between the UE and a base station, becomes an issue to be solved.

DISCLOSURE OF THE INVENTION

Embodiments of the disclosure provide data communication methods, apparatuses and storage medium, which are capable of implementing optimized scheduling of data communication in a component carrier between a UE and a base station according to capability of the UE.

According to a first aspect of the disclosure, there is provided a data communication method is provided, including the following operations: a user equipment (UE) acquires the UE's capability of using multiple radio frequency (RF) chains for data communication and sends a report including the UE's capability of using multiple radio frequency (RF) chains for data communication, to a base station.

In some embodiments, the method may further include the following operations: the UE receives an instruction on how to use the multiple RF chains in a component carrier for the data communication from the base station and configures a number of the RF chains to operate in the component carrier according to the instruction.

In some embodiments, the report may further include an operating bandwidth of each of the RF chains or an indication of using which RF chain to operate on which part of bandwidth of the component carrier.

In some embodiments, when the instruction includes allowing the UE to use more than one of the multiple RF chains in the component carrier, the operation of configuring a number of the RF chains to operate in the component carrier according to the instruction may include that the UE configures each of the more than one RF chains to operate on a part, that is separated from that of one another, of bandwidth of the component carrier, according to the instruction.

In some embodiments, when the instruction includes forbidding the UE from using more than one of the multiple RF chains in the component carrier, the operation of configuring a number of the RF chains to operate in the component carrier according to the instruction may include that the UE configures one of the RF chains to operate in the component carrier according to the instruction; and the method further include that the UE shuts down other of the RF chains.

In some embodiments, the instruction may further include using which part of bandwidth of the component carrier, and the operation of configuring one of the RF chains to operate in the component carrier according to the instruction may include that the UE configures the RF chain to operate on the indicated part of the bandwidth of the component carrier.

In some embodiments, the instruction may further include using a first and second parts of bandwidth of the component carrier for downlink and uplink data communication respectively, the operation of configuring one of the RF chains to operate in the component carrier according to the instruction may include configuring a downlink part of the RF chain to operate on the first part of the bandwidth of the component carrier and configuring an uplink part of the RF chain to operate on the second part of the bandwidth of the component carrier.

According to a second aspect of the disclosure, a data communication method is provided, including the following operations: a base station receives from a UE a report including the UE's capability of using multiple radio frequency (RF) chains for data communication, and instructs the UE on how to use the multiple RF chains in a component carrier based on the report.

Specifically, upon reception of the report, the base station may determine how the UE use the multiple RF chains in a component carrier for data communication based on the report, and send an instruction to the UE according to a result of the determination.

In some embodiments, the report may further include an operating bandwidth of each of the multiple RF chains or an indication of using which RF chain to operate on which part of bandwidth of the component carrier, and wherein the operation of determining how the UE use the multiple RF chains in a component carrier for data communication based on the report may include that the base station determines whether each of intervals between operating bands of the RF chains and between operating bands of the RF chains and the edges of the bandwidth of the component carrier is larger than or equal to a respective one of preset values; when each of the intervals is larger than or equal to the respective one of preset values, the base station determines to allow the UE to use more than one of the multiple RF chains in the component carrier for data communication; or when one of the intervals is smaller than the respective preset value, the base station determines to forbid the UE from using more than one of the multiple RF chains in the component carrier for data communication.

In some embodiments, when the base station determines to allow the UE to use more than one of the multiple RF chains in the component carrier for data communication, the instruction may include which of RF chains uses which part of the bandwidth of the component carrier.

In some embodiments, when the base station determines to allow the UE to use more than one of the multiple RF chains in the component carrier for data communication, in case that the base station operates multiple numerologies in the component carrier, the instruction may include using different RF chains for different numerologies.

In some embodiments, when the base station determines to forbid the UE from using more than one of the multiple RF chains in the component carrier, the instruction may include using which part of bandwidth of the component carrier.

In some embodiments, when the base station determines to forbid the UE from using more than one of the multiple RF chains in the component carrier for data communication, the method may further include that the base station determines to perform downlink and uplink data communication in the component carrier separately; the instruction may further include a first and second part of bandwidth of the component carrier to be used by the UE for downlink and uplink data communication respectively.

According to a third aspect of the disclosure, a data communication apparatus is provided, which includes an acquisition module and a sending module. The acquisition module is arranged to acquire a user equipment's (UE's) capability of using multiple radio frequency (RF) chains for data communication. The sending module is arranged to send a report including the UE's capability of using multiple RF chains for data communication, to a base station.

In some embodiments, the apparatus may further include a receiving module and a configuring module. The receiving module is arranged to receive an instruction on how to use the multiple RF chains in a component carrier for the data communication, from the base station. The configuring module is arranged to configure a number of the RF chains to operate in the component carrier according to the instruction.

In some embodiments, the report may further include an operating bandwidth of each of the RF chains or an indication of using which RF chain to operate on which part of bandwidth of the component carrier.

In some embodiments, when the instruction includes allowing the UE to use more than one of the multiple RF chains in the component carrier, the configuring module may be arranged to configure each of the more than one RF chains to operate on a part, that is separated from that of one another, of bandwidth of the component carrier, according to the instruction.

In some embodiments, when the instruction includes forbidding the UE from using more than one of the multiple RF chains in the component carrier, the configuring module may be arranged to configure one of the RF chains to operate in the component carrier according to the instruction; and the configuring module may further be arranged to shut down other of the RF chains.

In some embodiments, the instruction may further include using which part of bandwidth of the component carrier, and the configuring module may be arranged to configure the RF chain to operate on the indicated part of the bandwidth of the component carrier.

In some embodiments, the instruction may further include using a first and second parts of bandwidth of the component carrier for downlink and uplink data communication respectively, the configuring module may be arranged to configure a downlink part of the RF chain to operate on the first part of the bandwidth of the component carrier, and configure an uplink part of the RF chain to operate on the second part of the bandwidth of the component carrier.

According to a third aspect of the disclosure, a data communication apparatus is provided, which includes a receiving module and an instructing module. The receiving module is arranged to receive a report including a UE's capability of using multiple radio frequency (RF) chains for data communication. The instructing module may be arranged to instruct the UE on how to use the multiple RF chains in a component carrier based on the report.

In some embodiments, the instructing module may include a determining unit and a sending unit. The determining unit is arranged to determine how the UE use the multiple RF chains in a component carrier for data communication based on the report. The sending unit is arranged to send an instruction to the UE according to a result of the determination.

In some embodiments, the report may further include an operating bandwidth of each of the multiple RF chains or an indication of using which RF chain to operate on which part of bandwidth of the component carrier, and the determining unit may be arranged to determine whether each of intervals between operating bands of the RF chains and between operating bands of the RF chains and edges of the bandwidth of the component carrier is larger than or equal to a respective one of preset values; when each of the intervals is larger than or equal to the respective one of preset values, determine to allow the UE to use more than one of the multiple RF chains in the component carrier for data communication; or when one of the intervals is smaller than the respective preset value, determine to forbid the UE from using more than one of the multiple RF chains in the component carrier for data communication.

In some embodiments, when the determining unit determines to allow the UE to use more than one of the multiple RF chains in the component carrier for data communication, the instruction may include which of RF chains uses which part of the bandwidth of the component carrier.

In some embodiments, when the determining unit determines to allow the UE to use more than one of the multiple RF chains in the component carrier for data communication, in case that the base station operates multiple numerologies in the component carrier, the instruction may further include using different RF chains for different numerologies.

In some embodiments, when the determining unit determines to forbid the UE from using more than one of the multiple RF chains in the component carrier, the instruction may include using which part of bandwidth of the component carrier.

In some embodiments, when the determining unit determines to forbid the UE from using more than one of the multiple RF chains in the component carrier for data communication, the determining unit may further be arranged to determine to perform downlink and uplink data communication in the component carrier separately; the instruction may further include a first and second part of bandwidth of the component carrier to be used by the UE for downlink and uplink data communication respectively.

According to a fifth aspect of the disclosure, a computer readable storage radium is provided, having instructions stored therein, which when executed by a processor, causes the processor to execute the method as described above.

According to the disclosure, in a large bandwidth communication system, a UE may acquire and report its capability of using multiple RF chains for data communication to a base station. In this way, the base station may instruct the UE on how to use the multiple RF chains in a component carrier for the data communication. Accordingly, the base station can implement optimized scheduling of the data communication in the component communication. For example, it avoids interferences among the multiple RF chain when the multiple RF chains are directly used by the UE while taking full advantage of the bandwidth resources. Additionally, the UE may shut down the RF chain(s) determined not to be used, thus reducing the power consumption of the UE.

DETAILED DESCRIPTION OF THE INVENTION

Various aspects are now described with reference to the drawings. In the following description, for purposes of explanation, numerous specific details are set forth in order to provide a thorough understanding of one or more aspects. It may be evident, however, that such aspects may be practiced without these specific details.

Various aspects are described herein in connection with a user equipment (UE), which can be a wireless UE. The UE can also be called a system, device, subscriber unit, subscriber station, mobile station, mobile, mobile device, remote station, remote UE, access UE, user UE, UE, communication device, user agent, or user device. The UE may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless UE(s) and may also be referred to as an access point, a Node B, evolved Node B (eNB), H(e)NB, or some other terminology.

Figure 1:
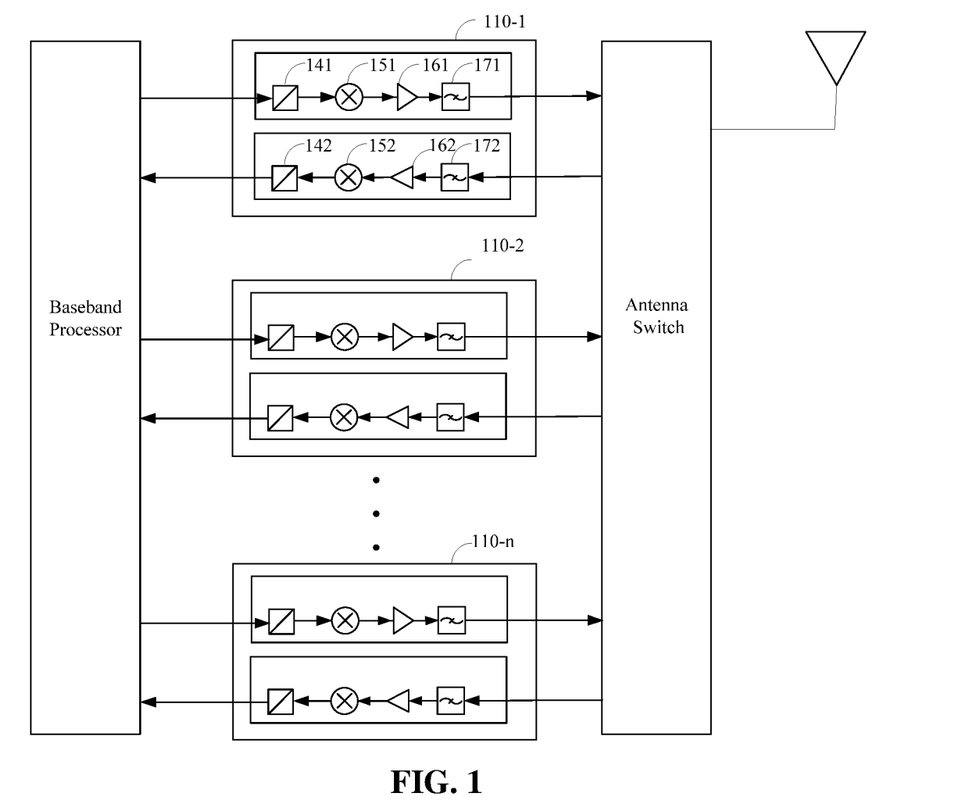
FIG. 1 illustrates a schematic view of a simplified structure of RF chains of a UE.

In order to provide a thorough understanding of the data communication method and apparatus according to the embodiments of the disclosure, first of all, RF chain(s) of a UE will be introduced hereinafter. FIG. 1 illustrates a schematic view of a simplified structure of RF chains of a UE. As shown in FIG. 1, the UE has a number n of RF chains 110-1, 110-2 . . . 110-*n*, where n is a positive integer greater than 1. Each of the RF chains 110-1, 110-2 . . . 110-*n* may include an uplink part (also referred to as a transmit (TX) chain) and a downlink part (also referred to as a receipt (RX) chain). The uplink part may be arranged to receive digital signals from a baseband processor, perform processing such as D/A conversion 141, frequency mixing 151, power amplification 161, filtering 171, and etc. on the digital signals and then transmit the processed signals through an antenna. The downlink part may be arranged to receive wireless signals from the antenna, perform processing such as filtering 172, low noise amplification 162, frequency mixing 152, A/D conversion 142, and etc. on the received signals and then send the processed signal to the baseband processor for further processing. Additionally, it is also known to persons of ordinary skill that the RF part of the UE may further include antenna switches arranged to perform switching among different RF chains, duplexers (not shown) arranged to perform duplex switching and other devices, which will not be elaborated herein.

Figure 2:
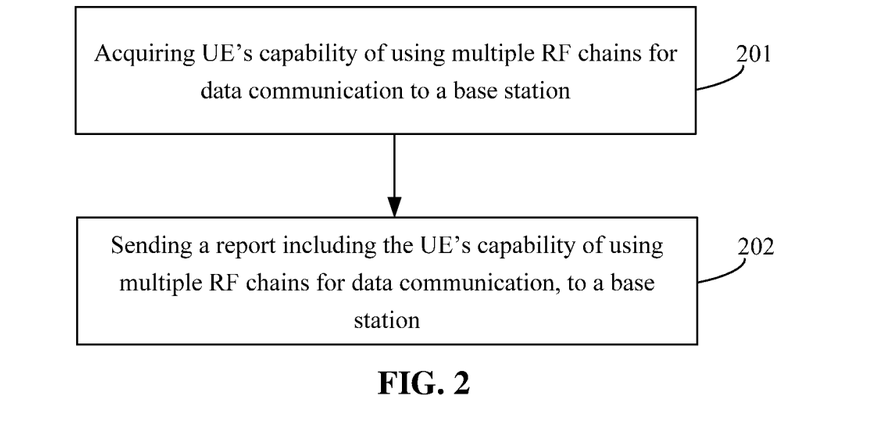
FIG. 2 illustrates a flow chart of a data communication method according to some embodiments of the disclosure.

According to some embodiments of the disclosure, a data communication method is provided. The method may be applied in a UE. The method implements control of operation of multiple RF chains included in the UE, such that the base station can implement optimized scheduling of the data communication in the component communication. As shown in FIG. 2, the method may include the following operations illustrated in blocks. The operations may start from block 201.

At block 201, the UE may acquire its capability of using multiple RF chains for data communication.

At block 202, the UE may send a report to a base station. The report may include the UE's capability of using multiple RF chains for data communication.

In some embodiments, the report may further include an operating bandwidth of each of the RF chains or an indication of using which RF chain to operate on which part of bandwidth of the component carrier.

In some embodiments, after block 202, the UE may receive an instruction on how to use the multiple RF chains in a component carrier for the data communication from the base station.

The instruction may generally include allowing the UE to use or forbidding the UE from using more than one of the multiple RF chains in the component carrier. Such an instruction may be made by the base station or other network side devices based on at least one of the bandwidth of the component carrier, channel conditions, types of services, and the operating bandwidths of the RF chains of the UE.

In these embodiments, upon reception of the instruction, the UE may configure a number of the RF chains to operate in the component carrier according to the instruction.

Accordingly, after configuring the RF chains, the UE may perform the data communication with the base station through using the number of the configured RF chains in the component carrier.

In the method described above, the report of the UE's capability of using multiple RF chains facilitates the base station to perform data communication scheduling. Compared with directly using multiple RF chains in a component carrier, interferences among multiple RF chains can be avoided due to the scheduling.

In some embodiments, when the instruction includes allowing the UE to use more than one of the multiple RF chains in the component carrier, the UE may configure each of the more than one RF chains to operate on a part of bandwidth of the component carrier, that is separated from that of one another, according to the instruction. In some embodiments, the report may further include details of RF implementation such as which RF chain to cover part of the bandwidth of the component carrier. For example, the component carrier may have a bandwidth of 80 MHz, and the UE may send a report including using 2 RF chains to cover the bandwidth, one RF chain to cover the lower 40 MHz, and the other RF chain to cover the upper 40 MHz, i.e., each of the RF chains covers half of the bandwidth. Then, after receiving the instruction including allowing the UE to use more than one of the multiple RF chains in the component carrier, the UE may configure the RF chains as reported.

In some embodiments, when the instruction includes forbidding the UE from using more than one of the multiple RF chains in the component carrier, the UE, after receiving the instruction, may configure one of the RF chains to operate in the component carrier.

In some embodiments, the operating bandwidths of the multiple RF chains of the UE are not completely the same. For example, the UE may have a first RF chain with an operating bandwidth of 40 MHz and a second RF chain with an operating bandwidth of 60 MHz, and the UE may report this to the base station. In this case, the instruction may further include which RF chain is to be used. In other words, the UE may either autonomously select one of the RF chains or directly use one of the RF chains as indicated to perform the data communication with the base station. In any case, the UE may shut down other of the RF chains which are not to be used, thereby reducing power consumption of the UE.

In some embodiments, in addition to forbidding the UE from using more than one of the multiple RF chains in the component carrier, the instruction may further include using which part of the bandwidth of the component carrier. For example, the bandwidth of the component carrier may be 80 MHz, and the instruction may include using the middle part (e.g., 40 MHz) of the bandwidth of the component carrier. In this case, the UE, after receiving the instruction, may configure the RF chain to be used to operate on the indicated part of the bandwidth of the component carrier. Accordingly, the UE may then perform the data communication with the base station through using the configured RF chain in the component carrier. Specifically, in order to configure the RF chain to be used to operate on the indicated part of the bandwidth of the component carrier, the UE may determine the operating frequency band of the RF chain according to the instruction and then configure a mixer in the RF chain based on the operating frequency band.

In some embodiments, when the instruction includes forbidding the UE from using more than one of the multiple RF chains in the component carrier, the instruction may further include using a first and second parts of bandwidth of the component carrier for downlink and uplink data communication respectively. In this case, the UE, after receiving the instruction, may configure a downlink part of one of the multiple RF chains to operate on the first part of the bandwidth of the component carrier, configure an uplink part of the RF chain to operate on the second part of the bandwidth of the component carrier. Accordingly, the UE may then perform the downlink data communication with the base station using the downlink part of the RF chain in the component carrier and perform the uplink data communication with the base station using the uplink part of the RF chain in the component carrier. For example, the bandwidth of the component carrier may be 80 MHz, and the instruction may include using the lower 40 MHz of the bandwidth for downlink data communication and using the upper 40 MHz of the bandwidth for uplink data communication. In this case, the UE configures the downlink part of the RF chain to operate on the lower 40 MHz and the uplink part of the RF chain to operate on the upper 40 MHz.

Figure 3:
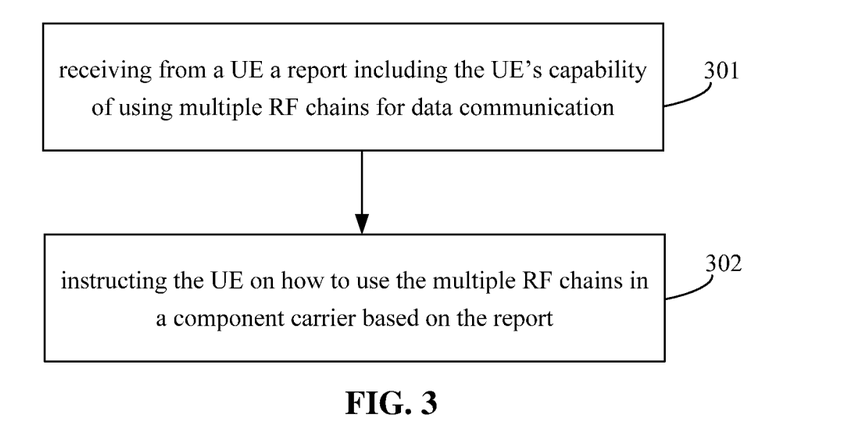
FIG. 3 illustrates a flow chart of a data communication method according to some embodiments of the disclosure.

According to some embodiments of the disclosure, a data communication method is provided. The method may be applied in a base station. The method implements control of operation of multiple RF chains included in a UE, such that the base station can implement optimized scheduling of the data communication in the component communication. As shown in FIG. 3, the method may include the following operations illustrated in blocks. The operations may start from block 301.

At block 301, the base station may receive a report including the UE's capability of using multiple RF chains for data communication from a UE.

At block 302, the base station may instruct the UE on how to use the multiple RF chains in a component carrier based on the report.

Specifically, the base station may determine how the UE use the multiple RF chains in a component carrier for data communication based on the report, and send an instruction according to a result of the determination to the UE. Accordingly, the base station may perform the data communication with the UE according to the instruction.

In the method described above, the base station instructs the UE on how to he multiple RF chains in a component carrier for data communication based on the UE's capability, thus implementing optimized scheduling of the data communication. Compared with directly using multiple RF chains in a component carrier, interferences among multiple RF chains can be avoided by the scheduling while still taking full advantage of the bandwidth resources.

In some embodiments, the report may further include an operating bandwidth of each of the multiple RF chains. In this case, the base station may determine to how the UE use the multiple RF chains in the component carrier according to bandwidth of the component carrier and the operating bandwidth of each of the multiple RF chains. Specifically, for example, the base station may determine whether each of intervals between operating bands of the RF chains and between operating bands of the RF chains and edges of the bandwidth of the component carrier is larger than or equal to a respective one of preset values, if multiple RF chains are to be used. The preset value may be a predefined guard interval that can avoid the multiple RF from impacting each other. Different preset values may be used at different parts of the component carrier. Additionally, the base station may further consider other factors such as channel conditions and types of services. As a result, the base station may determine to allow the UE to use more than one of the multiple RF chains in the component carrier or forbid the UE from using more than one of the multiple RF chains in the component carrier.

In some embodiments, when the base station determines to allow the UE to use more than one of the multiple RF chains in the component carrier for data communication, the instruction may further include an operating frequency band of each of the RF chains to be used, such as which RF chain use which part of the bandwidth. In some embodiments, the report may even include details of RF implementation such as which RF chain to cover part of the bandwidth of the component carrier. For example, the component carrier may have a bandwidth of 80 MHz, and the UE may send a report including using 2 RF chains to cover the bandwidth, one RF chain to operate on the lower 40 MHz, and the other RF chain to operate on the upper 40 MHz, i.e., each of the RF chains operates on half of the bandwidth. If the base station determines to allow the UE to use the two RF chains in the component carrier, the base station may send a one-bit instruction, such that the UE can perform the data communication as reported according to the instruction.

In some embodiments, the base station may operate multiple numerology in a component carrier. Here, the term "numerology" may be understood as a parameter set defined by sub-carrier spacing and cyclic prefix length. A new feature of the 5G NR communication system is supporting multiple numerology, which can be used at the same time. The sub-carrier spacing is defined to be equal to 15 KHz in the LTE/LTE-A communication system, while in the NR 5G communication system, a basic sub-carrier spacing is defined to be equal to 15 KHz, and can be expanded flexibly. That is, the sub-carrier spacing may be set to be 30 KHz, 60 KHz, 120 KHz, 240 KHz . . . . In this case, when the base station determines to allow the UE to use more than one of the multiple RF chains in the component carrier for data communication, the base station may send an instruction further including using different RF chains for different numerology, so as to decrease the potential interference among different numerology.

In some embodiments, the base station determines to forbid the UE from using more than one of the multiple RF chains in the component carrier. For example, example, when there is not sufficient guard interval at the edges of the bandwidth of the component carrier or between the operation frequency bands of the RF chains, the base station determines to forbid the UE from using more than one of the multiple RF chains in the component carrier. For example, the UE may have a first RF chain with an operating bandwidth of 40 MHz and a second RF chain with an operating bandwidth of 60 MHz, and the UE may report this to the base station. In this case, besides forbidding the UE to use more than one of the multiple RF chains, the instruction may further include which RF chain is to be used.

In some embodiments, in addition to forbidding the UE from using more than one of the multiple RF chains in the component carrier, the instruction may further include using which part of the bandwidth of the component carrier. For example, the bandwidth of the component carrier may be 80 MHz, and the instruction may include using the middle part (e.g., 40 MHz) of the bandwidth of the component carrier. In this case, such an instruction facilitates the UE to accurately configure the RF chain to be used.

In some embodiments, when the base station determines to forbid the UE from using more than one of the multiple RF chains in the component carrier, the base station may further determine to perform downlink and uplink data communication in the component carrier separately. In this case, the instruction may further include a first and second part of bandwidth of the component carrier to be used by the UE for downlink and uplink data communication respectively. For example, the bandwidth of the component carrier may be 80 MHz, and the instruction may include using the lower 40 MHz of the bandwidth for downlink data communication and using the upper 40 MHz of the bandwidth for uplink data communication. Such an instruction facilitates the UE to accurately configure the uplink and downlink parts of the RF chain to be used.

Based on the several data communication method embodiments described above in connection with FIG. 1, a data communication apparatus is provided according to some embodiments of the disclosure.

Figure 4:
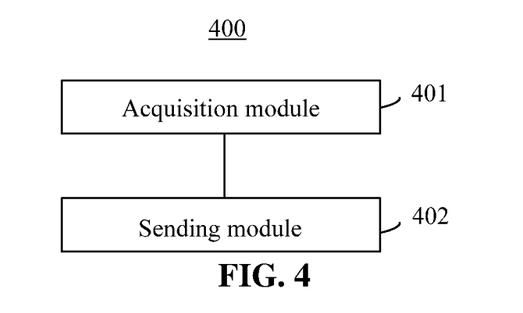
FIG. 4 illustrates a block diagram of a data communication apparatus according to some embodiments of the disclosure.

As shown in FIG. 4, the data communication apparatus 400 includes an acquisition module 401 and a sending module 402. In practice, the acquisition module 401 may be realized by a processor and the sending module 402 may be realized by a transceiver.

The acquisition module 401 may be arranged to acquire UE's capability of using multiple RF chains for data communication.

The sending module 401 may be arranged to send a report including the UE's capability of using multiple RF chains for data communication, to a base station.

In some embodiments, the apparatus may further include a receiving module and a configuring module. In practice, the receiving module may be realized by transceiver and the configuring module may be realized by the processor. The receiving module may be arranged to receive an instruction of how to use the multiple RF chains in a component carrier for the data communication, from the base station. The configuring module may be arranged to configure a number of the RF chains to operate in the component carrier according to the instruction.

Accordingly, the UE may perform the data communication with the base station through using the number of the configured RF chains in the component carrier.

In some embodiments, the report may further include an operating bandwidth of each of the RF chains or an indication of using which RF chain to operate on which part of bandwidth of the component carrier. When the instruction includes allowing the UE to use more than one of the multiple RF chains in the component carrier, the configuring module may be arranged to configure each of the more than one RF chains to operate on a part of bandwidth of the component carrier, that is separated from that of one another, according to the instruction.

In some embodiments, when the instruction includes forbidding the UE from using more than one of the multiple RF chains in the component carrier, the configuring module may be arranged to configure one of the RF chains to operate in the component carrier according to the instruction; and the configuring module may further be arranged to shut down other of the RF chains.

In some embodiments, when the instruction further includes using which part of bandwidth of the component carrier, and the configuring module may be arranged to configure the RF chain to operate on the indicated part of the bandwidth of the component carrier. In some embodiments, the instruction further includes using a first and second parts of bandwidth of the component carrier for downlink and uplink data communication respectively, the configuring module may be arranged to configure a downlink part of the RF chain to operate on the first part of the bandwidth of the component carrier, and configure an uplink part of the RF chain to operate on the second part of the bandwidth of the component carrier.

Accordingly, the UE may perform the downlink data communication with the base station using the downlink part of the RF chain in the component carrier, and perform the uplink data communication with the base station using the uplink part of the RF chain in the component carrier.

Figure 5:
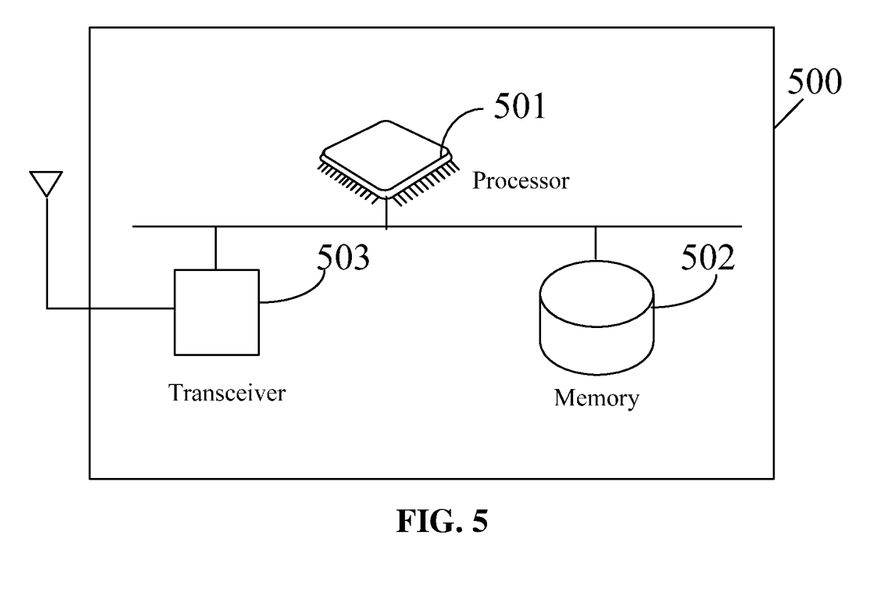
FIG. 5 illustrates a block diagram of a data communication apparatus according to some embodiments of the disclosure.

FIG. 5 is a simplified structural diagram of a UE according to an embodiment of the disclosure. The UE 500 may include a processor 501, a memory 502, and a transceiver 503 having multiple antennas. The memory 502 stores program instructions, which when executed by the processor 501, cause the processor 501 to cooperate with the transceiver 503 to perform at least one of the method described in connection with FIG. 2. The apparatus as shown in FIG. 4 may be implemented in the UE 500.

The benefits of the apparatus described here correspond to those described for the data communication method as described in connection with FIG. 1, and thus are omitted here.

Based on the several data communication method embodiments described above in connection with FIG. 2, a data communication apparatus is provided according to some embodiments of the disclosure.

Figure 6:
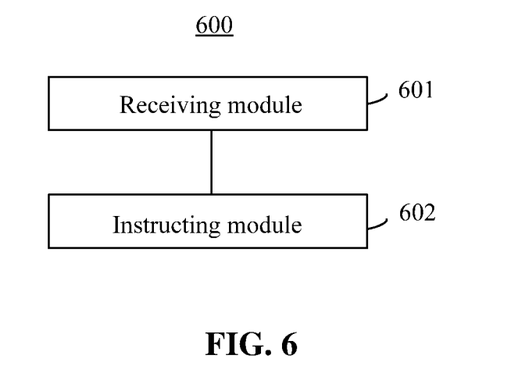
FIG. 6 illustrates a simplified structure diagram of a UE according to some embodiments of the disclosure.

As shown in FIG. 6, the data communication apparatus 600 includes a receiving module 601 and an instructing module 602. In practice, the receiving module 601 may be realized by a transceiver, and the instructing module 602 may be realized by a processor and the transceiver.

The receiving module 601 is arranged to receive from a UE a report including the UE's capability of using multiple RF chains for data communication.

The instructing module 602 is arranged to instruct the UE on how to use the multiple RF chains in a component carrier based on the report.

Specifically, the instructing module may include a determining unit and a sending unit. be arranged to determine how the UE use the multiple RF chains in a component carrier for data communication based on the report and send an instruction according to a result of the determination to the UE.

Accordingly, the data communication with the UE may be performed according to the instruction.

In some embodiments, the report further includes an operating bandwidth of each of the multiple RF chains or an indication of using which RF chain to operate on which part of bandwidth of the component carrier, and the determining unit is arranged to determine whether each of intervals between operating bands of the RF chains and between operating bands of the RF chains and edges of the bandwidth of the component carrier is larger than or equal to a respective one of preset values; when each of the intervals is larger than or equal to the respective one of preset values, determine to allow the UE to use more than one of the multiple RF chains in the component carrier for data communication; or when one of the intervals is smaller than the respective preset value, determine to forbid the UE from using more than one of the multiple RF chains in the component carrier for data communication.

In some embodiments, when the determining unit determines to allow the UE to use more than one of the multiple RF chains in the component carrier for data communication, the instruction may further include using which part of bandwidth of the component carrier.

In some embodiments, when the determining unit 602 determines to allow the UE to use more than one of the multiple RF chains in the component carrier for data communication, in case that the base station operates multiple numerologies in the component carrier, the instruction may further include using different RF chains for different numerologies.

In some embodiments, when the determining unit determines to forbid the UE from using more than one of the multiple RF chains in the component carrier, the instruction may include using which part of bandwidth of the component carrier.

In some embodiments, when the determining unit determines to forbid the UE from using more than one of the multiple RF chains in the component carrier, the determining unit 602 may further be arranged to determine to perform downlink and uplink data communication in the component carrier separately, and the instruction may further include a first and second part of bandwidth of the component carrier to be used by the UE for downlink and uplink data communication respectively.

Figure 7:
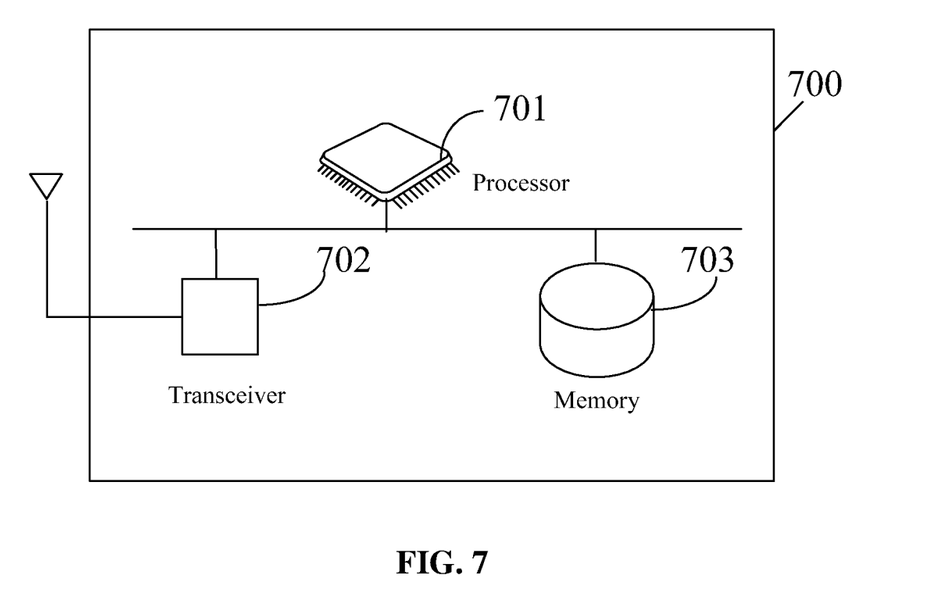
FIG. 7 illustrates a simplified structure diagram of a base station according to some embodiments of the disclosure.

FIG. 7 is a simplified structural diagram of a base station according to an embodiment of the disclosure. The base station 700 may include a processor 701, a memory 702, and a transceiver 703. The memory 702 stores program instructions, which when executed by the processor 701, cause the processor 701 to cooperate with the transceiver 703 to perform at least one of the method described in connection with FIG. 3. The apparatus as shown in FIG. 6 may be implemented in the base station 700.

The benefits of the apparatus described here correspond to those described for the data communication method as described in connection with FIG. 3, and thus are omitted here.

Those skilled in the art will appreciate that all or a part of the steps in the above embodiments can be implemented by computer programs. The computer programs can be stored in a computer readable storage medium and executed on a corresponding hardware platform (e.g., system, equipment, apparatus, device and the like) to perform one or a combination of the steps in the method embodiments.

Optionally, all or a part of the steps in the above embodiments can be implemented using Integrated Circuits (ICs). These steps can be implemented by one or more IC modules. As such, the present invention is not limited to any specific combination of hardware circuitry and software.

Respective devices or functional modules or functional units in the above embodiments can be implemented using general computing devices, which can be located in a single computing apparatus or distributed on a network including multiple computing devices.

When respective devices or functional modules or functional units in the above embodiments are implemented in the form of software functional modules and then sold or used as an independent product, they can be stored in a computer readable storage medium. The afore-mentioned computer readable storage medium can be magnetic disks and/or optical disks, such as Read Only Memories (ROMs), and the like.

The above description are merely preferable embodiments of the disclosure and are not intended to limit the scope of protection of the disclosure, and it will be apparent to those skilled in the art that various substitutions, modifications and changes may be made without departing from the scope and spirit of the invention. Therefore, the scope of protection of the disclosure should be interpreted solely in light of the claims.

INDUSTRIAL APPLICABILITY

According to the disclosure, in a large bandwidth communication system, a UE may acquire and report its capability of using multiple RF chains for data communication to a base station. In this way, the base station may instruct the UE on how to use the multiple RF chains in a component carrier for the data communication. Accordingly, the base station can implement optimized scheduling of the data communication in the component communication. For example, it avoids interferences among the multiple RF chain when the multiple RF chains are directly used by the UE while taking full advantage of the bandwidth resources. Additionally, the UE may shut down the RF chain(s) determined not to be used, thus reducing the power consumption of the UE.

What is claimed is:

1. A data communication method, comprising:
acquiring, by a user equipment (UE), the UE's capability, wherein the UE's capability comprises: multiple radio frequency (RF) chains in one component carrier for data communication;
sending, by the UE, a report including the UE's capability for data communication, to a base station; and
receiving, by the UE, an instruction on how to use the multiple RF chains in the component carrier for the data communication, from the base station,
wherein the report further includes an operating bandwidth of each of the multiple RF chains or an indication of using which RF chain to operate on which part of bandwidth of the component carrier, and
when each of intervals between operating bands of the RF chains and between operating bands of the RF chains and edges of the bandwidth of the component carrier is larger than or equal to a respective one of preset values, the UE is allowed to use more than one of the multiple RF chains in the component carrier for data communication; or when one of the intervals is smaller than the respective preset value, the UE is forbidden from using more than one of the multiple RF chains in the component carrier for data communication.

2. The method according to claim 1, further comprising:
configuring a number of the RF chains to operate in the component carrier according to the instruction.

3. The method according to claim 2, wherein when the instruction includes allowing the UE to use more than one of the multiple RF chains in the component carrier, configuring a number of the RF chains to operate in the component carrier according to the instruction comprises:
configuring each of the more than one RF chains to operate on a part, that is separated from that of one another, of bandwidth of the component carrier, according to the instruction.

4. The method according to claim 2, wherein when the instruction includes forbidding the UE from using more than one of the multiple RF chains in the component carrier, configuring a number of the RF chains to operate in the component carrier according to the instruction comprises:
configuring one of the RF chains to operate in the component carrier according to the instruction; and
wherein the method further comprises:
shutting down other of the RF chains.

5. The method according to claim 4, wherein the instruction further includes using which part of bandwidth of the component carrier, and configuring one of the RF chains to operate in the component carrier according to the instruction comprises:
configuring the RF chain to operate on the instructed part of the bandwidth of the component carrier.

6. The method according to claim 4, wherein the instruction further includes using a first and second parts of bandwidth of the component carrier for downlink and uplink data communication respectively, the configuring one of the RF chains to operate in the component carrier according to the instruction comprises:
configuring a downlink part of the RF chain to operate on the first part of the bandwidth of the component carrier; and
configuring an uplink part of the RF chain to operate on the second part of the bandwidth of the component carrier.

7. A data communication method, comprising:
receiving from a user equipment (UE), by a base station, a report including the UE's capability, wherein the UE's capability comprises: multiple radio frequency (RF) chains in one component carrier for data communication, wherein the report further includes an operating bandwidth of each of the multiple RF chains or an indication of using which RF chain to operate on which part of bandwidth of the component carrier; and
determining, by the base station, whether each of intervals between operating bands of the RF chains and between operating bands of the RF chains and edges of the bandwidth of the component carrier is larger than or equal to a respective one of preset values; and when each of the intervals is larger than or equal to the respective one of preset values, determining to allow the UE to use more than one of the multiple RF chains in the component carrier for data communication; or when one of the intervals is smaller than the respective preset value, determining to forbid the UE from using more than one of the multiple RF chains in the component carrier for data communication; and
sending, by the base station, an instruction of how to use the multiple RF chains in the component carrier to the UE according to a result of the determination.

8. The method according to claim 7, wherein when the base station determines to allow the UE to use more than one of the multiple RF chains in the component carrier for data communication, the instruction includes which of RF chains uses which part of the bandwidth of the component carrier.

9. The method according to claim 7, wherein when the base station determines to allow the UE to use more than one of the multiple RF chains in the component carrier for data communication, in case that the base station operates multiple numerologies in the component carrier, the instruction includes using different RF chains for different numerologies.

10. The method according to claim 7, wherein when the base station determines to forbid the UE from using more than one of the multiple RF chains in the component carrier, the instruction includes using which part of bandwidth of the component carrier.

11. The method according to claim 7, wherein when the base station determines to forbid the UE from using more than one of the multiple RF chains in the component carrier for data communication, the method further comprises:
determining, by the base station, to perform downlink and uplink data communication in the component carrier separately,
wherein the instruction further includes a first and second part of bandwidth of the component carrier to be used by the UE for downlink and uplink data communication respectively.

12. A user equipment, comprising:
a memory, in which one or more programs are stored;
a transceiver; and
a processor, wherein the programs, when executed by the processor, cause the processor to cooperate with the transceiver to:
acquire the user equipment's (UE's) capability, wherein the UE's capability comprises: multiple radio frequency (RF) chains in one component carrier for data communication; and
wherein the transceiver is further arranged to send a report including the UE's capability for data communication, to a base station, and receive an instruction on how to use the multiple RF chains in the component carrier for the data communication, from the base station, wherein the report further includes an operating bandwidth of each of the multiple RF chains or an indication of using which RF chain to operate on which part of bandwidth of the component carrier, and when each of intervals between operating bands of the RF chains and between operating bands of the RF chains and edges of the bandwidth of the component carrier is larger than or equal to a respective one of preset values, the UE is allowed to use more than one of the multiple RF chains in the component carrier for data communication; or when one of the intervals is smaller than the respective preset value, the UE is forbidden from using more than one of the multiple RF chains in the component carrier for data communication.

13. The user equipment according to claim 12, wherein the processor is arranged to configure a number of the RF chains to operate in the component carrier according to the instruction.

14. The user equipment according to claim 13, wherein when the instruction includes allowing the UE to use more than one of the multiple RF chains in the component carrier, the processor is arranged to configure each of the more than one RF chains to operate on a part, that is separated from that of one another, of bandwidth of the component carrier, according to the instruction.

15. The user equipment according to claim 13, wherein when the instruction includes forbidding the UE from using more than one of the multiple RF chains in the component carrier, the processor is arranged to configure one of the RF chains to operate in the component carrier according to the instruction; and wherein the processor is further arranged to shut down other of the RF chains.

16. The user equipment according to claim 15, wherein the instruction further includes using which part of bandwidth of the component carrier, and the processor is arranged to configure the RF chain to operate on the indicated part of the bandwidth of the component carrier.

17. The user equipment according to claim 15, wherein the instruction further includes using a first and second parts of bandwidth of the component carrier for downlink and uplink data communication respectively, the processor is arranged to:

configure a downlink part of the RF chain to operate on the first part of the bandwidth of the component carrier; and configure an uplink part of the RF chain to operate on the second part of the bandwidth of the component carrier.

18. A base station, comprising:

a memory, in which one or more programs are stored;

a transceiver, arranged to receive a report including a user equipment's (UE's) capability, wherein the UE's capability comprises: multiple radio frequency (RF) chains in one component carrier for data communication, wherein the report further includes an operating bandwidth of each of the multiple RF chains or an indication of using which RF chain to operate on which part of bandwidth of the component carrier; and a processor, wherein the programs, when executed by the processor, cause the processor to determine whether each of intervals between operating bands of the RF chains and between operating bands of the RF chains and edges of the bandwidth of the component carrier is larger than or equal to a respective one of preset values; and when each of the intervals is larger than or equal to the respective one of preset values, determine to allow the UE to use more than one of the multiple RF chains in the component carrier for data communication; or when one of the intervals is smaller than the respective preset value, determine to forbid the UE from using more than one of the multiple RF chains in the component carrier for data communication, wherein the transceiver is arranged to send an instruction of how to use the multiple RF chains in the component carrier to the UE according to a result of the determination.

19. The base station according to claim 18, wherein when the processor determines to allow the UE to use more than one of the multiple RF chains in the component carrier for data communication, the instruction includes which of RF chains uses which part of the bandwidth of the component carrier.

20. The base station according to claim 18, wherein when the processor determines to allow the UE to use more than one of the multiple RF chains in the component carrier for data communication, in case that the base station operates multiple numerologies in the component carrier, the instruction further includes using different RF chains for different numerologies.

21. The base station according to claim 18, wherein when the processor determines to forbid the UE from using more than one of the multiple RF chains in the component carrier, the instruction includes using which part of bandwidth of the component carrier.

22. The base station according to claim 18, wherein when the processor determines to forbid the UE from using more than one of the multiple RF chains in the component carrier for data communication, the processor is further arranged to determine to perform downlink and uplink data communication in the component carrier separately, wherein the instruction further includes a first and second part of bandwidth of the component carrier to be used by the UE for downlink and uplink data communication respectively.

* * * * *